T

(12) United States Patent
Sun

(10) Patent No.: US 9,244,727 B2
(45) Date of Patent: Jan. 26, 2016

(54) METHOD AND APPARATUS FOR IMPLEMENTING TASK-PROCESS-TABLE BASED HARDWARE CONTROL

(75) Inventor: Yingxian Sun, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 793 days.

(21) Appl. No.: 13/579,567

(22) PCT Filed: May 5, 2011

(86) PCT No.: PCT/CN2011/073705
§ 371 (c)(1),
(2), (4) Date: Aug. 17, 2012

(87) PCT Pub. No.: WO2011/137751
PCT Pub. Date: Nov. 10, 2011

(65) Prior Publication Data
US 2012/0311601 A1     Dec. 6, 2012

(30) Foreign Application Priority Data

May 5, 2010 (CN) .......................... 2010 1 0162875

(51) Int. Cl.
*G06F 9/48* (2006.01)
*H04L 25/02* (2006.01)
*H04B 1/707* (2011.01)

(52) U.S. Cl.
CPC ...... *G06F 9/48* (2013.01); *H04L 25/02* (2013.01); *H04B 1/707* (2013.01); *H04L 25/022* (2013.01); *H04L 25/0204* (2013.01)

(58) Field of Classification Search
None
See application file for complete search history.

(56) References Cited

U.S. PATENT DOCUMENTS 6,598,146 B1 * 7/2003 Bru et al. ..................... 712/17

2005/0289189 A1 * 12/2005 Nettleton et al. ............. 707/200
(Continued)

FOREIGN PATENT DOCUMENTS

| CN | 1318958 C | 5/2007 |
|---|---|---|
| CN | 1955933 A | 5/2007 |

(Continued)

OTHER PUBLICATIONS

International Search Report in international application No. PCT/CN2011/073705, mailed on Jul. 14, 2011.
(Continued)

*Primary Examiner* — Hassan Kizou
*Assistant Examiner* — Hasim Bhatti
(74) *Attorney, Agent, or Firm* — Oppedahl Patent Law Firm LLC

(57) ABSTRACT

Disclosed is a method for implementing task-process-table based hardware control, which includes dividing a task that has to be implemented by a hardware circuit into multiple sub-processes, and determining the depth of the task process table according to the number of the sub-processes; according to the control information of the hardware unit corresponding to each sub-process and the number (SPAN) of clock cycles occupied by hardware processing for the sub-process, determining the bit width of the task process table and generating the task process table; starting the hardware unit corresponding to each sub-process in an order of the sub-processes, under the control of the control information in the task process table, and completing the processing of each sub-process. A device for implementing hardware control is also disclosed. The disclosure enables precise control of the hardware control flow and is of versatility. For the hardware implementation of a task with a complex algorithm flow, the data processing flow is accurate, and the development efficiency is improved.

18 Claims, 3 Drawing Sheets

(56) References Cited

U.S. PATENT DOCUMENTS

2007/0101330 A1* 5/2007 Aizawa .................. 718/100
2008/0183779 A1* 7/2008 Jia .................................. 708/1

FOREIGN PATENT DOCUMENTS

CN         101478381  A    7/2009
EP         1389848    A1   2/2004

OTHER PUBLICATIONS

English Translation of the Written Opinion of the International Search Authority in international application No. PCT/CN2011/073705, mailed on Jul. 14, 2011.

* cited by examiner

METHOD AND APPARATUS FOR IMPLEMENTING TASK-PROCESS-TABLE BASED HARDWARE CONTROL

TECHNICAL FIELD

The disclosure relates to the field of wireless communication and signal processing technology, and in particular to a method and an apparatus for implementing task-process-table based hardware control.

BACKGROUND

In a wireless mobile communication and signal processing system, for a hardware circuit (or an integrated circuit), usually, a flow of processing signal data input to a hardware module has to be designed based on a given algorithm, to achieve real-time data processing. For a common hardware circuit design (a functional sub-module in the integrated circuit), a starting/enabling signal corresponding to the hardware module is generally used as a trigger signal, a counter with a proper bit width is designed to accumulate operating clocks after the module is started, and the clock count value obtained by accumulating is used as a hardware clock cycle of a certain data processing flow in the corresponding algorithm description currently processed by the hardware. Generally, the hardware processing cycle can be predetermined. By analyzing the algorithm processing flow and the correspondence between the algorithm processing flow and the hardware circuit design, the hardware clock cycle corresponding to each algorithm processing flow can be predetermined. When the accumulated count value of the operating hardware clock reaches the predetermined hardware clock cycle, the current hardware processing is stopped, that is, the data processing flow defined in the algorithm description is finished.

In time division synchronous code division multiple access (TD-SCDMA) mobile communication base band processing system, particularly in the mobile terminal processing system at the user side, the algorithm flow designed based on joint detection is complex, and it is somewhat difficult for the hardware to perform the function. For example, in an algorithm flow of estimating channel transmission coefficients of a plurality of cells, it is necessary to perform downlink reception of midamble code and transfrom the midamble code from time-domain to frequency-domain (Fast Fourier Transform process, FFT), to eliminate interferences from the received midamble code in the frequency domain and the signals of all receiving cells, and then to perform the corresponding dot division operation of 128 dots with the basic midamble code of the current processing cell configured by software; to transform the data to the time-domain form by inverse FFT; next, for the transmission path in the transfer function, a multi-cell based joint main-path justification and a noise reduction process are performed to obtain a valid transmission path meeting the performance requirement; and finally, the data needs to be transformed to the frequency-domain form by FFT to perform the corresponding dot multiplication operation of 128 dots with the basic midamble code of the current processing cell configured by software to finish the reconstruction of a signal. Moreover, the processes above need to be iterated for many times according to the definition of performance simulation.

At present, most hardware designs are designed to be triggered under a counting condition of a counter and to generate a control signal in real time as a control flow. However, in the occasion that processing the TD-SCDMA terminal base band chip which has more complex implementation of function design and has a high demand on the control of data processing flow, it is very difficult to design the hardware fully satisfying the entire algorithm flow and it is very difficult to control the entire function implementation by using the control flow.

SUMMARY

The problem to be solved by the disclosure is to provide a method and a device for implementing task-process-table based hardware control, for overcoming the defect in the prior art that it is very difficult to implement the hardware satisfying the entire algorithm flow process.

To achieve the above object, according to the technical solutions of the disclosure, a method for implementing task-process-table based hardware control is provided, which includes: step A: dividing tasks that has to be performed by a hardware circuit into multiple sub-processes, and determining a depth of the task process table according to a number of the sub-processes; step B: determining a bit width of the task process table according to control information of the hardware circuit corresponding to each of the sub-processes and a number of clock cycles occupied by hardware processing for the sub-process (SPAN), and generating the task process table; and step C: successively starting a hardware unit corresponding to each of the sub-processes to perform the sub-processes, in an order of the sub-processes, under control of the control information in the task process table.

Further, in step B, after determining the bit width of the task process table, there may be a step of combining sub-processes, in which when a sub-process has a direct data input/output relation with an adjacent next sub-process and there is no need to store an intermediate result of the sub-process since no subsequent sub-process other than the adjacent next sub-process will process the intermediate result, combining the sub-process and the adjacent next sub-process; or when the hardware units used by two adjacent sub-processes have no multiplexing relation, combining control words of the two adjacent sub-processes.

Further, in step B, after combining the sub-processes, there may be a step of performing parallel control of the sub-processes, in which when input data for two sub-processes have no parallel relation and the hardware units used have no multiplexing relation, controlling the two sub-processes to be processed in parallel.

Further, the bit width of the task process table may include: a number of clock cycles for each single process, for controlling jump of the sub-process; and a control word that needs to use by each single process, for starting a corresponding hardware mechanism.

Further, step C may include: C1: reading the control information from the task process table in an order of the sub-processes, wherein the control information includes input control word, output control word and enabling control word; C2: selecting, from input data, data needed by the current sub-process to input, in accordance with the input control word; C3: starting the hardware unit corresponding to the current sub-process to process data, in accordance with the enabling control word; C4: outputting a processing result of the current sub-process, in accordance with the output control word; C5: while performing step C2 to step C4, counting and accumulating the number of clock cycles for performing the steps, when the accumulated number of clock cycles is equal to the SPAN, reading the control information of a next sub-process in the task process table; C6: repeating step C2 to step C4 until all sub-processes are performed.

Further, the control information may further comprises constant control word, and/or intermediate result control word; in step C3, the method may further includes selecting and reading, in accordance with the constant control word, the constant data needed during operation; and/or reading or storing, in accordance with the intermediate result control word, the data intermediate node result in processing of the sub-processes.

According to the technical solutions of the disclosure, a device for implementing task-process-table based hardware control is provided, which includes: a control unit, in which a task process table is stored, configured to control start of a hardware unit corresponding to each of sub-processes and jump of the sub-process according to the task process table, wherein the task process table includes control information of the hardware unit corresponding to the sub-process and a number (SPAN) of clock cycles occupied by hardware processing for the sub-process; an input data storage unit, configured to store input data needed by each of the sub-process; a multiplexer 1, configured to select the input data needed by the current sub-process according to the task process table and send the selected data to the hardware circuit; a hardware circuit including hardware units, each of the hardware units corresponding to a respective sub-process and configured to perform processing of the sub-process; and an output data storage unit, configured to store output data processed by the hardware circuit.

Further, the control unit may comprise: a task process table storage sub-unit, configured to store the task process table; a control sub-unit, configured to control the start of the hardware unit and data processing corresponding to each of the sub-processes according to the task process table; and a jump sub-unit, configured to control the hardware circuit to process a next sub-process after the processing of a current sub-unit is completed.

Further, the jump sub-unit may comprise an adder 1, configured to count clock cycles after the hardware unit corresponding to a sub-process is stared; a comparator 1, configured to compare a counting result of the adder 1 with the SPAN for the sub-process, wherein when the counting result of the adder 1 is less than the SPAN, the comparator 1 outputs a pulse signal to drive the adder 1 to continue counting clock cycles; when the counting result of the adder 1 is equal to the SPAN, the comparator 1 outputs a pulse signal to reset the adder 1 and meanwhile drive an adder 2; the adder 2, configured to count a number of completed sub-processes; a comparator 2, configured to compare the counting result of the adder 2 with a total number of the sub-processes, when the counting result of the adder 2 is less than the total number of the sub-processes, the comparator 2 outputs a pulse signal to drive the adder 2 to continue counting; when the counting result of the adder 2 is equal to the total number of the sub-processes, the comparator 2 outputs a pulse signal to reset the adder 2.

The device may further includes a constant storage unit, configured to store constant data needed during the processing of sub-processes; a multiplexer 2, configured to select and read the constant data stored in the constant storage unit according to the task process table and send the constant data to the hardware circuit; an intermediate result storage unit, configured to store data intermediate node result in the processing of the sub-processes; a multiplexer 3, configured to select data stored in the intermediate result storage unit and the corresponding sub-process and read or store the intermediate result, according to the task process table.

Compared with the prior art, the advantages of the disclosure are as follows:

by analyzing and detailing a task into a plurality of sub-processes, presetting a task process table designed for hardware, and controlling the entire hardware function systematically, the disclosure implements precise control of the hardware control flow; in addition, the disclosure is of universality; for the hardware implementation scene of a task with a complex algorithm flow, the accuracy of the data processing flow is guaranteed and the development efficiency is greatly improved.

DETAILED DESCRIPTION

The specific implementation of the disclosure is further illustrated in detail in conjunction with accompanying drawings and embodiments; the embodiments below are provided to illustrate the disclosure and not to limit the scope of the disclosure.

Figure 1:
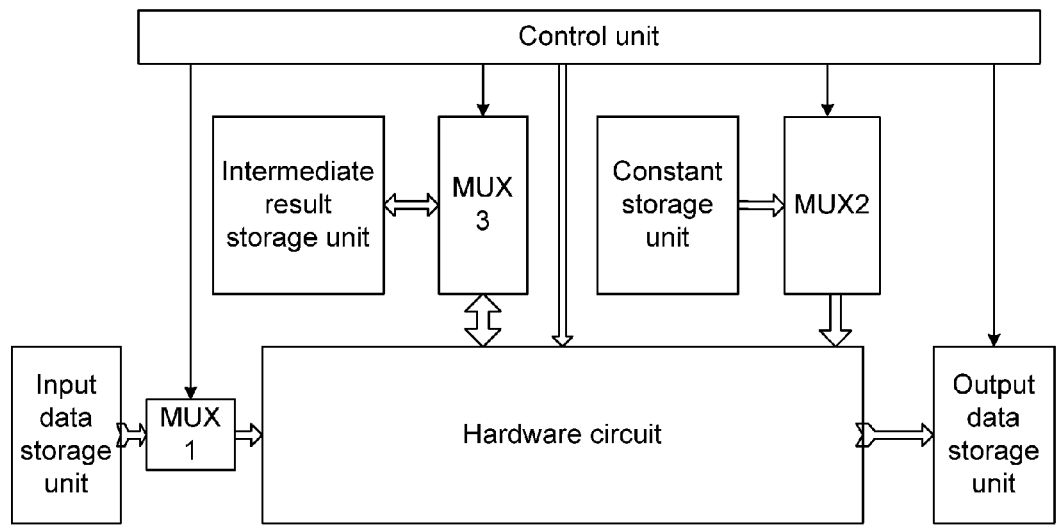
FIG. 1 shows a structure schematic view of a device for implementing task-process-table based hardware control according to the disclosure.

FIG. 1 shows the structure of the device for implementing task-process-table based hardware control (TASK-TABLE) according to the disclosure. The device comprises:

a control unit (ROM_TASK_TABLE_CONTRL) in which a task process table is stored, for controlling the start of the hardware circuit corresponding to each sub-process and the jump of the sub-process according to the task process table, wherein the task process table includes the control information of the hardware circuit corresponding to each sub-process and the number of clock cycles for the hardware processing for the sub-process, SPAN; the ROM_TASK_TABLE_CONTRL is a control table, which is designed based on the function flow that a hardware circuit needs to implement and can control the control flow and the function implementation of the entire hardware as a whole;

an input data storage unit (INPUT_MEMORY), for storing the input data needed by each sub-process, wherein the INPUT_MEMORY can consist of a plurality of rams for storing input data;

an multiplexer (MUX) 1, for selecting the input data needed by the current sub-process according to the task process table and sending the selected data to the hardware circuit;

a hardware circuit (MODULE_OPERATION_UNIT) including hardware units, each of the hardware units corresponding to a respective sub-process and for performing the corresponding sub-process, wherein the MODULE_OPERATION_UNIT represents a circuit for implementing the specific function of the hardware module, and may be a function entity consisting of an adder, a multiplier, a comparator, a counter and other specific hardware units;

an output data storage unit (OUTPUT_MEMORY), for storing the output data processed by the hardware circuit, wherein the OUTPUT_MEMORY may consist of a plurality of rams for storing output data;

a constant storage unit (ROM_SOURCE), for storing the constant data needed during the processing of sub-processes;

an MUX 2, for selecting and reading the constant data stored in the constant storage unit according to the task process table and sending the constant data to the hardware circuit;

an intermediate result storage unit (RAM_SOURCE), for storing the data intermediate node results during the processing of sub-processes;

an MUX 3, for selecting the data stored in the intermediate result storage unit and the corresponding sub-process according to the task process table and performing the reading or storing of the intermediate result.

Further, the control unit controls the MUX 1 through Tn_input_sel; the control unit controls the MUX 3 through Tn_ram_sel; the control unit controls the hardware circuit through Tn_en; the control unit controls the MUX 2 through Tn_rom_sal; the control unit controls the output data storage unit through Tn_output_set.

The control unit ROM_TASK_TABLE_CONTRL shown in FIG. 1 comprises a task process table storage sub-unit, a control sub-unit and a jump sub-unit, wherein the task process table storage sub-unit is configured to store the task process table; the control sub-unit is configured to control the start of the hardware circuit corresponding to each sub-process and the data processing according to the task process table; the jump sub-unit is configured to control the hardware circuit to process a next sub-process after the processing of a sub-unit is completed. The specific design form of the ROM_TASK_TABLE_CONTRL is an ROM with a storage depth of (N+1) and a bit width of (M+1), wherein the storage depth corresponds to the number of the sub-processes implemented by the entire hardware function; the storage bit width corresponds to a total bit width which is obtained by adding the sum of the corresponding bits of the control signal needed in each sub-process and the hardware clock cycle bits SPAN corresponding to the sub-process; wherein the structure of the task process table is shown in Table 1.

table; the structure of the jump sub-unit in the disclosure is shown in Table 1, comprising two adders and two comparators, wherein the adder 1 is configured to count clock cycles after the hardware circuit corresponding to a sub-process is stared; the comparator 1 is configured to compare the counting result of the adder 1 with the number SPAN of the clock cycles occupied by the hardware processing for the sub-process, when the counting result of the adder 1 is less than SPAN, the comparator 1 outputs a pulse signal to drive the adder 1 to continue counting clock cycles; when the counting result of the adder 1 is equal to SPAN, the comparator 1 outputs a pulse signal to reset the adder 1 and meanwhile drive the adder 2; the adder 2 is configured to count the finished sub-processes; the comparator 2 is configured to compare the counting result of the adder 2 with the total number of the sub-processes, when the counting result of the adder 2 is less than the total number of the sub-processes, the comparator 2 outputs a pulse signal to drive the adder 2 to continue counting; when the counting result of the adder 2 is equal to the total number of the sub-processes, the comparator 2 outputs a pulse signal to reset the adder 2.

Figure 2:
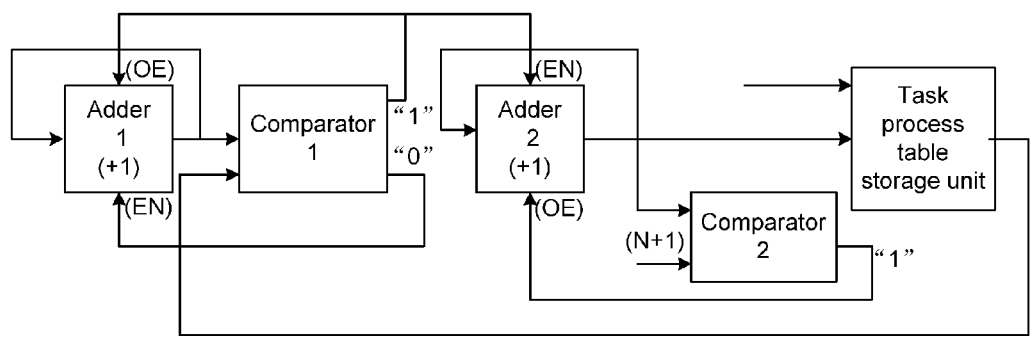
FIG. 2 shows a structure schematic view of a jump sub-unit according to the disclosure.

At the initial time when the hardware circuit is started to perform arithmetic operation, the counter value task_cnt shown in FIG. 2 is 0; at this time, the read address ROM_rdaddr input to the task process table is 0 also, and the initial value of the variable SPAN is 0 also.

The adder 1 acts as a counter task_cnt, and performs the following operations: during the period "enable" after the hardware circuit is started, the adder 1 is always in an operating state, meanwhile a comparison detection is performed by the comparator 1; when the counting value task_cnt is less than SPAN, the comparator 1 outputs a pulse signal (signal "0" output by comparator 1 in FIG. 2) to drive the counter task_cnt to continue performing Plus 1 operation; when the counting value of the task_cnt is equal to the current variable value SPAN, the comparator 1 outputs a pulse signal (signal "1" output by comparator 1 in FIG. 2) to reset the counter task_cnt and meanwhile drive the adder 2.

The adder 2 is configured to generate a read address signal ROM_rdaddr of the task process table, and performs the

TABLE 1

| | | bit_0 | bit_1 | bit_2 | | | bit_M | |
|---|---|---|---|---|---|---|---|---|
| Rd_add1: | Sub-process1 | T0_span | T0_en | T0_input_sel | T0_output-sel | T0_rom-sel | T0_ram_se; | ... |
| ↓ | | | | | | | | |
| Rd_addr_N+1: | Sub-processN+1 | Tn_span | Tn_en | Tn_input_sel | Tn_output-sel | | Tn_rom-sel Tn_ram_se; | ... |

In Table 1, the design of the specific content of the ROM_TASK_TABLE_CONTRL, that is, the control signals corresponding to bit_0 to bit_M of ROM as shown in Table 1, depends on the actual hardware function requirement and the arithmetic process, for example, addition, multiplication, comparison, logic judgement and other specific arithmetic operations needed in the processing of sub-processes by hardware; wherein the determination and design of the value SPAN is determined by the number of operating clock cycles actually needed by the hardware to process a sub-process; the bit width definition of the final variable SPAN is determined by the sub-process which needs the maximum number of operating clock cycles in all sub-processes processed by hardware corresponding to the current arithmetic process.

In the disclosure, the hardware clock cycles SPAN corresponding to the sub-process has certain relation with the read address ROM_rdaddr of the ROM_TASK_TABLE_CONTRL, and the relation determines the implementation of the sub-process jump process of hardware by way of task process following operations: after the hardware circuit is started, when the current ROM_rdaddr is less than the maximum number (N+1) of the hardware circuit sub-processes, the adder 2 drives the Plus 1 operation of itself according to the pulse signal (signal "1" output by comparator 1 in FIG. 2) output by the comparator 1; otherwise, when the current ROM_rdaddr is equal to the maximum number (N+1) (signal "1" output by comparator 2 in FIG. 2) of the hardware circuit sub-processes, the counter ROM_rdaddr is reset, which indicates that the current hardware has completed a cycle of the algorithm flow.

For each sub-process, the variable SPAN is the number of clock cycles occupied by the hardware processing for the single sub-process, that is, the "life cycle" of the single sub-process; the SPAN is defined in a part of bit variables of the read data obtained by reading the ROM_TASK_TABLE_CONTRL; provided the read data is of (M+1) bit-width, and p-bit-width data therein is assigned to the variable SPAN, that is, a p-bit binary constant value. The bit width of the variable SPAN is determined by the maximum operating clock cycle number in the hardware-processed sub-processes.

For the read control of the task process table, as shown in FIG. 2, the read enabling is directly connected to the hardware circuit as an enable signal, for indicating that the read operation is performed on the task process table all the time to acquire a control signal during the hardware driving period; the read address is connected as the ROM_rdaddr generated by the adder 2 mentioned above.

The method for implementing task-process-table based hardware control of the disclosure is illustrated in detail below by providing an embodiment, in which described is a hardware control implementation of a task of the channel transmission coefficient estimation algorithm flow for a plurality of cells. In the embodiment, the algorithm flow that needs to by implemented by the hardware comprises: receiving the midamble code in the downlink and transforming the midamble code from time-domain to frequency-domain (an FFT process); eliminating interferences from the received midamble code in the frequency domain and the signals of all receiving cells; second, performing the corresponding dot division operation of 128 points with the basic midamble code of the current processing cell configured by software; transforming the data to the time-domain form by inverse FFT transform; next, performing a multi-cell based joint main-path justification and a noise reduction process for the transmission path in the transfer function to obtain a valid transmission path meeting the performance requirement; and finally, transforming the data to the frequency-domain form by FFT and performing the corresponding dot multiplication operation of 128 dots with the basic midamble code of the current processing cell configured by software to finish the reconstruction of a signal. The processes above need to be iterated for four times, that is, four cycles of the algorithm flow, according to the definition of performance simulation. The specific data processing flow is as shown in FIG. 3.

Figure 3:
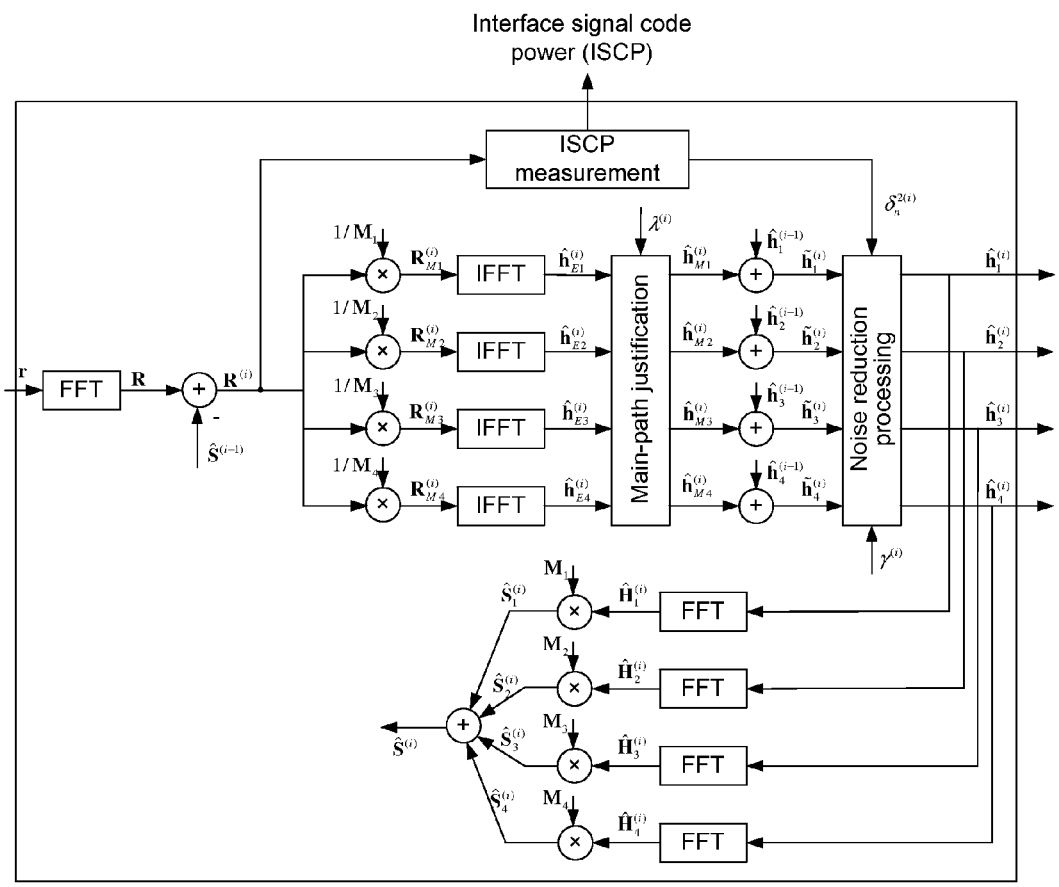
FIG. 3 shows a schematic view of the implementation of a multi-cell channel estimation algorithm flow according to the embodiment of the disclosure.
Figure 4:
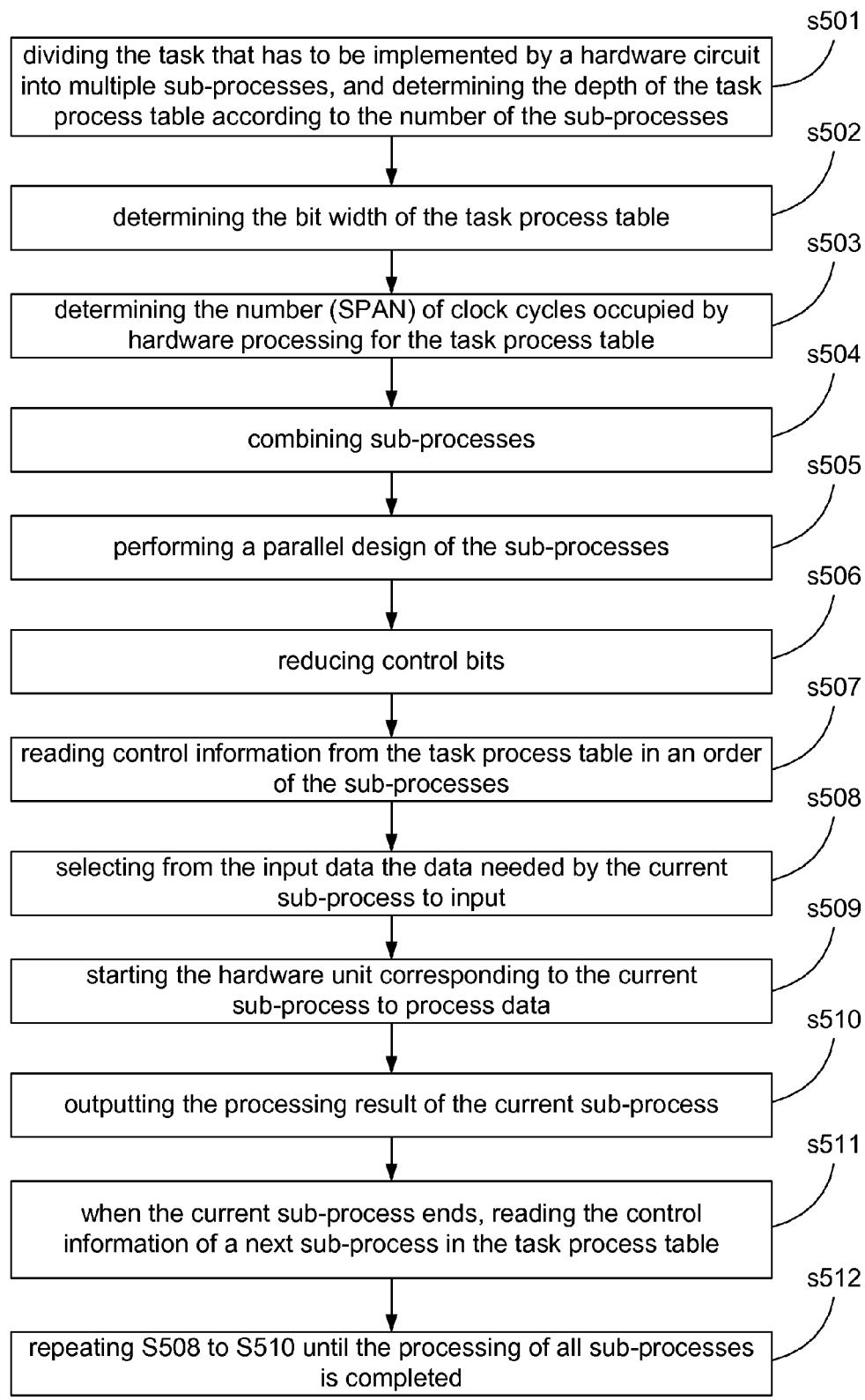
FIG. 4 shows a flowchart of a method for implementing task-process-table based hardware control according to the embodiment of the disclosure.

FIG. 3 show the flowchart of the method for implementing task-process-table based hardware control in the embodiment of the disclosure. First, the tasks that needs to be performed by a hardware circuit is divided into multiple sub-processes, wherein the depth of the task process table depends on the number of the sub-processes; second, according to the control information of the hardware units corresponding to each sub-process and the SPAN for the sub-process, the bit width of the task process table is determined to form the task process table, wherein the bit width of the task process table includes two parts: 1. the number of clock cycles for each single process, for controlling the jump of sub-processes; 2. the control word for use by each single process, for starting corresponding hardware, for example, reading or outputting data, starting hardware units correspondingly and so on; and finally, in an order of the sub-processes, under the control of the control information in the task process table, successively starting the hardware units corresponding to each sub-process, and completing the processing of each sub-process. Referring to FIG. 4, the embodiment comprises the following steps:

S501: the task that needs to be implemented by the hardware circuit is analyzed, the flow thereof is sub-divided and converted into (N+1) functional sub-processes, that is, the hardware performs the (N+1) functional sub-processes sequentially to finish the entire algorithm flow.

In the embodiment, the process of determining the number of sub-processes is to analyze the task that needs to be implemented by the hardware circuit, the flow thereof is sub-divided and converted into (N+1) function sub-processes; in the embodiment, for the algorithm flow analysis of the multi-cell channel estimation processing in the TD-SCDMA mobile communication base band processing system, the data processing process above is sub-divided into the following 10 sub-processes:

①  receive MA data: the data receiving process, which corresponds to "receiving the midamble code in the downlink";

②  MA FFT: the FFT transform process, which corresponds to "transforming the midamble code data from time-domain to frequency-domain (FFT process)";

③  interference-counteract: the interference elimination (deduction) process, which corresponds to "eliminating interferences from the received midamble code in the frequency domain and the signals of all receiving cells";

④  initial_che: the initial channel estimation (dot multiplication) process, which corresponds to "performing the corresponding dot division operation of 128 dots with the basic midamble code of the current processing cell configured by software";

⑤  IFFT: the inverse FFT process, which corresponds to "transforming the initial channel estimation result obtained by dot division to the time-domain data by inverse FFT";

⑥  mainpath_justify: the justification process, which corresponds to "performing a multi-cell based joint main-path justification for the transmission path in the transfer function";

⑦  noisethr_justify: the justification process, which corresponds to "performing a noise reduction process to obtain a valid transmission path meeting the performance requirement";

⑧  FFT: the FFT transform process, which corresponds to "transforming the time-domain data by FFT to obtain the transmission path information in the frequency domain";

⑨  reconst_interf: the dot multiplication process, which corresponds to "performing the corresponding dot multiplication operation of 128 dots with the basic midamble code of the current processing cell configured by software to finish the reconstruction of a signal";

⑩  subsequent iteration processing, which just needs to repeat steps ③ to ⑨ for three times, that is, four iterations of data processing defined by the algorithm flow are accomplished totally.

By the analysis of algorithm flow above, we can determine the depth (N+1) of the TASK_TABLE (task process table) is: 2+7*4=30, in which, "2" corresponds to ① and ②; "7" corresponds to ③ to ⑨; "4" corresponds to four iterations, that is, ③ to ⑨ are repeated for four times.

S502: the bit width of the task process table is determined; the hardware circuit corresponding to the (N+1) sub-processes in S501 is designed, for example, the ram, rom, gate circuit, multiplier, adder, comparator and counter used in the hardware implementation, and the control bits corresponding to the respective units are designed.

In the embodiment, the determination of bit width is divided into three aspects: the number of the Memories (ram or rom) involved in the processing of sub-processes; the design of the needed corresponding control word for the hardware unit; the determination of the bit width of the SPAN. Detailed analysis is provided below in conjunction of the processing of each sub-process:

Sub-process "① receive MA data" relates to data source midamble input to a sub-module, thus, 1-bit data selection control is needed; --datasource_sel[0];

Sub-process "② MA FFT" relates to the data processing as follows: FFT process, input of data processing and output of result; --FFT_en, data_sel[0], result_temp_sel[0];

Sub-process "③ interference-counteract" relates to the subtraction process in interference counteraction, and the ram selection of the subtracted data; --ic_en, Data_sel[1];

Sub-process "④ initial_che" relates to the dot division operation, and the data ram selection in division operation and the result storage; --initial_che, Data_sel[2], result_temp_sel[1];

Sub-process "⑤ IFFT" relates to the IFFT data transform, the data ram selection in calculation and the result storage; --initial_che, Data_sel[3], result_temp_sel[2];

Sub-process "⑥ mainpath_justify" relates to the valid transmission path justification based on joint main-path, the data ram selection and the result storage; --mainpath_justify, data_sel[3], result_temp_sel[3];

Sub-process "⑦ noisethr_justify" relates to the valid transmission path justification based on noise path, the data ram selection and the result storage; --noisethr_justify, data_sel[4], postH_sel[0], result_temp_sel[4];

Sub-process "⑧ FFT" relates to the FFT process, the input of data processing and the output of result; --FFT_en, data_sel[5], result_temp_sel[5];

Sub-process "⑨ reconst_interf" relates to the dot multiplication process, the input of data and the output of result; --reconst_interf, data_sel[6], interf_sel[0].

For the iterative rounds of the processes ③ to ⑨ above, and the data stream distinguishing of this cell and adjacent cells (totally three), it is needed to add control words: turn_flag[1:0]—four iterations totally; cell_flag[3:0]—a single bit corresponding to the processing of each cell, four cells totally.

From the analysis above, we calculate the width of the control bits and obtain that the bit width (M+1) of TASK_TABLE is 41; for details, refer to the application diagram of the TASK_TABLE hardware control design for the multi-cell channel estimation algorithm flow implementation as shown in Table 2.

TABLE 2

| Signal TASK-id | span [0:8] | Data_sel [0:5] | result_temp_sel | postH_sel [0:3] | interf_sel [0:4] | datasource_sel [0:3] | powercal_sel | IC_en | Initial_che | Main_path_justify |
|---|---|---|---|---|---|---|---|---|---|---|
| 1 | 66 | s100000 | s1000 | s0000 | s00000 | s0000 | 0 | 0 | 0 | 0 |
| 2 | 485 | s010000 | s1000 | s0000 | s00001 | s1000 | 0 | 0 | 0 | 0 |
| 3 | 78 | s000001 | s0000 | s0000 | s00000 | s0000 | 0 | 0 | 0 | 0 |
| 4 | 78 | s000001 | s1000 | s0000 | s00000 | s0000 | 0 | 1 | 1 | 0 |
| 5 | 78 | s010001 | s1100 | s0000 | s00000 | s1000 | 0 | 1 | 1 | 0 |
| 6 | 78 | s010001 | s1010 | s0000 | s00000 | s1000 | 0 | 1 | 1 | 0 |
| 7 | 78 | s010001 | s1001 | s0000 | s00000 | s1000 | 0 | 1 | 1 | 0 |
| 8 | 251 | s010000 | s1000 | s0000 | s00000 | s1000 | 1 | 0 | 0 | 0 |
| 9 | 485 | s001000 | s0100 | s0000 | s00000 | s0100 | 1 | 0 | 0 | 0 |
| 10 | 485 | s000100 | s0010 | s0000 | s00000 | s0010 | 1 | 0 | 0 | 0 |
| 11 | 485 | s000010 | s0001 | s0000 | s00000 | s0001 | 1 | 0 | 0 | 0 |
| 12 | 78 | s010000 | s1000 | s0000 | s00000 | s0000 | 0 | 0 | 0 | 1 |
| 13 | 78 | s001000 | s0100 | s0000 | s00000 | s0000 | 0 | 0 | 0 | 1 |
| 14 | 78 | s000100 | s0010 | s0000 | s00000 | s0000 | 0 | 0 | 0 | 1 |
| 15 | 78 | s000010 | s0001 | s0000 | s00000 | s0000 | 0 | 0 | 0 | 1 |
| 16 | 78 | s010000 | s1000 | s1000 | s00000 | s0000 | 0 | 0 | 0 | 0 |
| 17 | 78 | s011000 | s1100 | s0100 | s00000 | s1000 | 0 | 0 | 0 | 0 |
| 18 | 78 | s010100 | s1010 | s0010 | s00000 | s1000 | 0 | 0 | 0 | 0 |
| 19 | 78 | s010010 | s1001 | s0001 | s00000 | s1000 | 0 | 0 | 0 | 0 |
| 20 | 251 | s010000 | s1000 | s0000 | s00000 | s1000 | 0 | 0 | 0 | 0 |
| 21 | 78 | s011000 | s0100 | s0000 | s10000 | s0100 | 0 | 0 | 0 | 0 |
| 22 | 407 | s001000 | s0100 | s0000 | s00000 | s0100 | 0 | 0 | 0 | 0 |
| 23 | 78 | s001100 | s0010 | s0000 | s01000 | s0010 | 0 | 0 | 0 | 0 |
| 24 | 407 | s000100 | s0010 | s0000 | s00000 | s0010 | 0 | 0 | 0 | 0 |
| 25 | 78 | s000110 | s0001 | s0000 | s00100 | s0001 | 0 | 0 | 0 | 0 |
| 26 | 407 | s000010 | s0001 | s0000 | s00000 | s0001 | 0 | 0 | 0 | 0 |
| 27 | 78 | s000010 | s0000 | s0000 | s00010 | s0000 | 0 | 0 | 0 | 0 |

| Signal TASK-id | noise_thr_justify | Reconst_interf | FFT_En | IV_FFT | iscp_en | Powercal_en | turn_flag [0:2] | cell_flag [0:3] |
|---|---|---|---|---|---|---|---|---|
| 1 | 0 | 0 | 0 | 0 | 0 | 0 | s000 | s0000 |
| 2 | 0 | 0 | 1 | 0 | 0 | 0 | s000 | s0000 |
| 3 | 0 | 0 | 0 | 0 | 0 | 0 | s000 | s0000 |
| 4 | 0 | 0 | 0 | 0 | 1 | 1 | s000 | s1000 |
| 5 | 0 | 0 | 1 | 1 | 0 | 0 | s000 | s1100 |
| 6 | 0 | 0 | 1 | 1 | 0 | 0 | s000 | s1010 |
| 7 | 0 | 0 | 1 | 1 | 0 | 0 | s000 | s1001 |
| 8 | 0 | 0 | 1 | 1 | 0 | 1 | s000 | s1000 |
| 9 | 0 | 0 | 1 | 1 | 0 | 1 | s000 | s0100 |
| 10 | 0 | 0 | 1 | 1 | 0 | 1 | s000 | s0010 |
| 11 | 0 | 0 | 1 | 1 | 0 | 1 | s000 | s0001 |
| 12 | 0 | 0 | 0 | 0 | 0 | 1 | s000 | s1000 |
| 13 | 0 | 0 | 0 | 0 | 0 | 1 | s000 | s0100 |
| 14 | 0 | 0 | 0 | 0 | 0 | 1 | s000 | s0010 |
| 15 | 0 | 0 | 0 | 0 | 0 | 1 | s000 | s0001 |
| 16 | 1 | 0 | 0 | 0 | 0 | 1 | s000 | s1000 |
| 17 | 1 | 0 | 1 | 1 | 0 | 1 | s000 | s1100 |
| 18 | 1 | 0 | 1 | 1 | 0 | 1 | s000 | s1010 |
| 19 | 1 | 0 | 1 | 1 | 0 | 1 | s000 | s1001 |
| 20 | 0 | 0 | 1 | 1 | 0 | 0 | s000 | s1000 |
| 21 | 0 | 1 | 1 | 0 | 0 | 0 | s000 | s1100 |
| 22 | 0 | 0 | 1 | 1 | 0 | 0 | s000 | s0100 |
| 23 | 0 | 1 | 1 | 0 | 0 | 0 | s000 | s0110 |

TABLE 2-continued

| 24 | 0 | 0 | 1 | 0 | 0 | 0 | s000 | s0010 |
| 25 | 0 | 1 | 1 | 0 | 0 | 0 | s000 | s0011 |
| 26 | 0 | 0 | 1 | 0 | 0 | 0 | s000 | s0001 |
| 27 | 0 | 1 | 0 | 0 | 0 | 0 | s000 | s0001 |

The control word bits above only includes the control of data stream selection and processing way (multiplication, substraction, FFT transform or justification), but not includes the control of the "number of clock cycles occupied for the hardware processing" SPAN corresponding to each sub-process.

Of course, for the control process above, based on the consideration of control clearness or control bit word conservation, different designers may select different ways, provided that precise control of the sub-processes is implemented and ROM_memory resources used as ROM_TASKTABLE is not wasted.

S503: the number SPAN of clock cycles occupied for the hardware processing is determined for the TASK_TABLE. In the embodiment, the number of the operating clock cycles occupied by the hardware for each sub-process is counted to get the value of SPAN for a single sub-process, specifically comprising the following:

Sub-process "①receive MA data": according to the algorithm design concept, the received 128 midamble code data are divided into two paths to input concurrently, and thus 128/2=64 clks are needed; besides, considering the read enabling, register hit-beat operation transmitted to the top layer, and thus 2 clks are added; therefore, 64+2=66 clks are needed, that is, span_①=66.

Sub-process "②MA FFT": the 128-dot FFT process, in order to conserve resources, is finished by using a complex multiplier; the seven-stage FFT butterfly calculation, with each stage 64 butterflies, totally needs 64*7=448 clks according to the pipeline design concept; considering that each butterfly complex multiplication costs 3 clks and each stage of calculation needs to calculate the overflow indication and process displacement (related to fixed-point scheme), it is accurately calculated that 485 clks are needed, that is, span_②=485.

Sub-process "③interference-counteract": it is needed to generate the read enabling of the data needed by the corresponding sub-process and perform deduction operation for the data, wherein there are 64 deductions totally; according to the pipeline design concept, in consideration of the fixed-point processing, 78 clks are needed totally, that is, span_③=78.

Sub-process "④initial_che": the dot-division operation, wherein the division operation is performed using the result of Sub-process "③interference-counteract" (the process of multiplying by reciprocal), totally needing 64 multiplications; according to the pipeline design concept, in consideration of the fixed-point processing, 78 clks are needed totally, that is, span_④=78.

Sub-process "⑤IFFT": the 128-dot IFFT process, which is similar to FFT. The difference lies in that conjugate processing is performed at the input/output and scaling of the output data; for the analysis process, refer to "②MA FFT"; it is accurately calculated that 485 clks are needed, that is, span_⑤=485.

Sub-process "⑥mainpath_justify": the process of data justification selects the maximum transmission path energy, performs weighting and then performs threshold justification filtering; there are totally 64 groups of data, according to the pipeline design concept, in consideration of the fixed-point processing, 78 clks are needed totally, that is, span_⑥=78.

Sub-process "⑦noisethr_justify": the process of data justification obtains a justification threshold, in which weighting is performed with the noise power and then justification filtering is performed; there are totally 64 groups of data, according to the pipeline design concept, in consideration of the fixed-point processing, 78 clks are needed totally, that is, span_⑦=78.

Sub-process "⑧FFT": the 128-dot FFT process, of which analysis can be referred to "②MA FFT"; it is accurately calculated that 485 clks are needed, that is, span_⑧=485.

Sub-process "⑨reconst_interf": the dot multiplication operation, in which multiplication operation is performed using the result of Sub-process "⑧FFT"; there are totally 64 multiplications, according to the pipeline design concept, in consideration of the fixed-point processing, 78 clks are needed totally, that is, span_⑨=78.

So far, the number of the clock cycles needed for the data processing in each sub-process is determined; thus the value SPAN corresponding to each rom read address of the TASK_TABLE can be determined; wherein the maximum value of the SPAN is 485, which is expressed by 9 bits; therefore, a 9-bit control word corresponding to the span is added in the control bits of the TASK_TABLE.

From the analysis above, we can see that the span values of many sub-processes are the same, for example, 78 and 485, because in hardware design the hardware is not designed in a "tile" manner according to algorithm flow and the multiplexing of hardware resources should be taken into count strictly.

S504: the sub-processes are combined; when a sub-process has a direct data input/output relation with an adjacent next sub-process and there is no need to store an intermediate result of the sub-process since no subsequent sub-process other than the adjacent next sub-process will process the intermediate result, the sub-process and the adjacent next sub-process are combined; or when the hardware units used by two adjacent sub-processes have no multiplexing relation, control words of the two adjacent sub-processes are combined. Proper combination of the sub-processes may conserve the time for storing and reading data in the memory for the whole hardware processing during the switching between the sub-processes.

The reasonable merging of sub-processes can save the memory data storing and reading time needed by the switching between sub-processes in the whole hardware processing.

In the embodiment, provided that there are four sequential sub-processes, namely, A, B, C and D, the output of the sub-process A is A1 and A2 both of which are used as the input of the sub-process B, and there is no other input for the sub-process B, then the combination of sub-processes A and B into a sub-process E can be considered; if the output of the sub-process C is C1, C2 and C3, wherein only C1 is used as the input of the sub-process D (or the sub-process D does not need any data of C1, C2 and C3), and the other two calculated results C2 and C3 can not be used until several sub-processes passed, at this moment, for accurate control, it is necessary to separate the sub-process C from the sub-process D, and the combination of sub-processes C and D is not considered. For example, in the multi-cell channel estimation algorithm, when all outputs of the "③ interference-counteract" are input to Sub-process "④ initial_che", the design of sub-process combination is considered.

S505: parallel design of sub-processes. In the embodiment, when the input data of two sub-processes has no parallel relation and the hardware units used have no multiplexing relation, the two sub-processes are controlled to perform parallel processing. Provided there are four sub-processes, namely, A, B, C and D, wherein the input data needed by the sub-processes A and B has no serial relation, that is, the sub-process B does not use the result calculated by the sub-process A as input, at this moment, the possibility of paralleling sub-processes A and B can be considered. In addition, provided that the calculation of the sub-process B needs a relatively long time of hardware operating clock cycles (the corresponding SPAN value), during which the sub-processes C and D can completely finish the processing, the input data needed by the sub-processes C and D has no relation with the sub-process B, and the output results of the sub-processes C and D do not share the ram with the output of the sub-process B, then the parallel design of the sub-process B and the sub-processes C and D can be considered, that is, the sub-processes C and D process data while the sub-process B processes data. At this moment, the sub-process design is: the sub-process B is split into a sub-process B1, a sub-process B2 and a sub-process B3, wherein the processing time of B1 is consistent with that of the sub-process C (that is, the SPAN values are designed to be consistent), the processing time of B2 is consistent with that of the sub-process D, and the B3 continues to process the remaining process of the entire sub-process B after the processing of the B1 and B2 is completed, that is, SPAN_B=SPAN_B1+SPAN_B2+SPAN_B3.

For example, in the multi-cell channel estimation algorithm, the data processing Sub-process "⑤ IFFT" of this cell is after the Sub-process "④ initial_che", however, in consideration of the data processing flow of other multiple cells, since the Sub-process "⑤ IFFT" is the inverse FFT transform of 128-point data, and the number of hardware processing clocks needed is big (485 clks are far more than 78 clks), it is considered to process the Sub-processes "④ initial_che" of other adjacent cells in parallel; for example, the Sub-process "④ initial_che" needs 78 clks while the Sub-process "⑤ IFFT" needs 485 clks, then the concept of parallel design of sub-processes can be implemented as follows:

the data processing Sub-process "④ initial_che" (78 clks) of this cell;
the data processing Sub-process "⑤ IFFT" of this cell (the first 78 clks), meanwhile processing the Sub-process "④ initial_che" (78 clks) of the first adjacent cell;
the data processing Sub-process "⑤ IFFT" of this cell (the second 78 clks), meanwhile processing the Sub-process "④ initial_che" (78 clks) of the second adjacent cell;
the data processing Sub-process "⑤ IFFT" of this cell (the third 78 clks), meanwhile processing the Sub-process "④ initial_che" (78 clks) of the third adjacent cell;
the data processing Sub-process "⑤ IFFT" of this cell (the remaining time: 500−78−78−78−78=251 clks).

The processing flow above is the parallel sub-process design, which is reflected in tasks 5 to 8 in Table 2. Such design not only implements the definition of algorithm flow but also saves the hardware processing time as far as possible.

S506: control bits are reduced. In Table 2, the control bit of the input or output ram corresponding to a sub-process takes a single-bit corresponding control mode, that is, a bit corresponds to a control mode. However, when calculating the width of all control bits of the finally formed TASKTABLE, if the bit number is just a bit greater than $2^n$ (for example, 65-bit or 66-bit which is several bits more than 64-bit), at this moment, in order to save ram resources, bit combination can be considered to design control signals.

Provided that four original bits A1, A2, A3 and A4 control RAM1, RAM2, RAM3 and RAM4 respectively, based on bit conservation, a combination of two bits A1 and A2 can be designed to control the four RAMs, because the combination of two bits also can control four states.

However, in the condition that hardware resources are not very insufficient, it is better to apply single-bit corresponding control when possible, because the ram depth and ram width used by the control flow design generally are not very great, which is similar to the control flow design of TASKTABLE. The final implementation is done by curing REG and does not necessarily use very great and demanding ram resources. Besides, the design of single-bit corresponding control is very convenient to use in the simulation error correction phase and facilitates the follow-up version development design.

Through the steps above, the embodiment finishes the "Preset" design process of the TASKTABLE for the multi-cell channel estimation algorithm flow and obtains the content of ROM_TASK_TABLE_CONTRL.

S507: in accordance with the order of the sub-processes, control information is read from the task process table successively to obtain input control word, output control word, enabling control word, constant control word and intermediate result control word. In the embodiment, the hardware circuit starts and reads control words from the task process table ROM_TASK_TABLE_CONTRL in the order of the sub-processes (from 1 to N+1), that is, reads task1 related control word and SPAN value, including: data_sel[5:0]= 6'b000001, result_temp_sel[3:0]=4'b0001, span[8:0]=9'd66; other control words are 0.

S508: in accordance with the input control word, the data needed by the current sub-process are selected from the input data to input. In the embodiment, in accordance with the control bit definition of data_sel[5:0]=6'b000001, the data needed by the current sub-process is selected from the input data to input and prepare to receive the transmitted antenna midamble code data.

S509: in accordance with the enabling control word, the hardware unit corresponding to the current sub-process is started to process data. In the embodiment, in accordance with the control bit definition of result_temp_sel[3:0]= 4'b0001, the function unit in the module is started and the data is processed, that is, the antenna midamble code data is stored into the specified ram; in accordance with the control bit definition of constant control word, the ROM constant data needed during operation is selectively read; in accordance with the control bit definition of intermediate result control word, the data intermediate node result in the processing of sub-processes is properly read or stored.

S510: in accordance with the output control word, the process result of the current sub-process is output. In the embodiment, since task1 only needs to process and receive 64 groups of data, after the hardware clock count regulated by the current SPAN value is reached, the data is stored into the specified ram.

S511: while executing S508 to S510, counting and accumulating the clocks needed to complete the steps, when the accumulated clock cycle number is equal to the SPAN, the control information of a next sub-process in the task process table is read. In the embodiment, task_cnt performs count accumulation according to the hardware circuit in FIG. 2; when S510 ends, that is, the count of task_cnt reaches the "life cycle" SPAN value (66 clks) for the current sub-process task1, the task_cnt triggers the ROM_rdaddr Plus 1 operation and reads a next read address of the task process control table ROM_TASK_TABLE_CONTRL to obtain a new bit control word.

S512: S508 to S510 are repeated until the processing of all sub-processes is completed. In the embodiment, task2, task3 . . . taskN+1 are successively read to obtain new related control word and SPAN value; S508 to S510 are repeated respectively, when the hardware finishes processing the last (N+1) sub-process of the algorithm flow corresponding to the hardware design, the processing of the whole algorithmic operation of the hardware ends The above is the whole actual process of the hardware data processing. The final result output by the whole hardware is read in the predefined ram or a flag register unit in turn. In the embodiment, the hardware design mode of TASK-TABLE recommends using interfaces between sub-processes inside a module and the interfaces between the module and other external hardware sub-system to use RAM as an interface for batch data interaction and for the flag register to output variable result.

The unique design applied by the disclosure comprises the following: (1) detailing and designing the whole control flow and all control signals of the hardware circuit, presetting in a TASK-TABLE control contents for controlling the ROM; (2) transferring the process node data inside the hardware modules through the ram interface between sub-processes, for the convenience of hardware simulation and fast error locating; (3) selecting hardware to implement parallel design according to the implementation of actual processing flow, to improve the hardware processing efficiency; (4) precisely controlling the hardware data flow and the hardware implementation process by reading the task sub-processes regulated in the preset ROM in the hardware; the design is particularly suitable for the real-time system with complex data processing flow and is convenient for the hardware corresponding to the new algorithm flow to implement update, and shortens the period of development.

The implementation of task-process-table based hardware control based on a task process table according to the disclosure has the following advantages:

1. by analyzing and detailing the algorithm flow of a task, presetting a TASK-TABLE control table designed by hardware, and controlling the entire hardware function systematically, the disclosure enables precise control of the hardware control flow;

2. the intermediate node result of data processing in a module is easy to be distinguished, stored and exported from a memory, facilitates the GOLDEN-CASE (typical simulation case) phase simulation in the initial design stage, improves design efficiency and saves development time;

3. the precise control of the time for the whole hardware module processing facilitates the design of a signal interface of the follow-up hardware sub-system;

4. by classifying and analyzing (from algorithm perspective or hardware implementation perspective) the sub-processes performed by hardware, it is easy to optimize the maintenance of the follow-up development and update the system (algorithm) design, and shorten the development period of the follow-up version;

5. it has strong universality and high applicability, particularly for hardware implementation scene of a task with a complex algorithm flow, it is able to guarantee the accuracy of the data processing flow, and greatly improves the efficiency of the development.

The above is only the preferred embodiment of the disclosure; it should be noted that for those ordinary technicians in the field of the technology, various modifications and changes can be made to the disclosure without departing from the technical principle of the disclosure. These modifications and changes are regarded as included in the scope of the disclosure.

The invention claimed is:

1. A method for implementing task-process-table based hardware control, comprising:
   step A: dividing tasks that has to be performed by a hardware circuit into multiple sub-processes, and determining a depth of the task process table according to a number of the sub-processes;
   step B: determining a bit width of the task process table according to control information of the hardware circuit corresponding to each of the sub-processes and a number of clock cycles occupied by hardware processing for the sub-process (SPAN), and generating the task process table; and
   step C: successively starting a hardware unit corresponding to each of the sub-processes to perform the sub-processes, in an order of the sub-processes, under control of the control information in the task process table.

2. The method for implementing task-process-table based hardware control according to claim 1, further comprising:
   in step B, after determining the bit width of the task process table, combining sub-processes, in which
   when a sub-process has a direct data input/output relation with an adjacent next sub-process and there is no need to store an intermediate result of the sub-process since no subsequent sub-process other than the adjacent next sub-process will process the intermediate result, combining the sub-process and the adjacent next sub-process; or when the hardware units used by two adjacent sub-processes have no multiplexing relation, combining control words of the two adjacent sub-processes.

3. The method for implementing task-process-table based hardware control according to claim 2, further comprising:
   in step B, after combining the sub-processes, performing parallel control of the sub-processes, in which
   when input data for two sub-processes have no parallel relation and the hardware units used have no multiplexing relation, controlling the two sub-processes to be processed in parallel.

4. The method for implementing task-process-table based hardware control according to claim 1, wherein the bit width of the task process table includes:
   a number of clock cycles for each single process, for controlling jump of the sub-process; and
   a control word that needs to use by each single process, for starting a corresponding hardware mechanism.

5. The method for implementing task-process-table based hardware control according to claim 1, wherein step C comprises:
   step C1: reading the control information from the task process table in an order of the sub-processes, wherein the control information includes input control word, output control word and enabling control word;
   step C2: selecting, from input data, data needed by the current sub-process to input, in accordance with the input control word;
   step C3: starting the hardware unit corresponding to the current sub-process to process data, in accordance with the enabling control word;
   step C4: outputting a processing result of the current sub-process, in accordance with the output control word;
   step C5: while performing step C2 to step C4, counting and accumulating the number of clock cycles for performing the steps, when the accumulated number of clock cycles is equal to the SPAN, reading the control information of a next sub-process in the task process table; and step C6: repeating step C2 to step C4 until all sub-processes are performed.

6. The method for implementing task-process-table based hardware control according to claim 5, wherein the control information further comprises constant control word, and/or intermediate result control word; in step C3, the method further comprises:

selecting and reading, in accordance with the constant control word, the constant data needed during operation;

and/or reading or storing, in accordance with the intermediate result control word, the data intermediate node result in processing of the sub-processes.

7. A device for implementing task-process-table based hardware control, comprising:

a control circuit, in which a task process table is stored, configured to control start of each hardware circuit corresponding to each sub-process and jump of the each sub-process according to the task process table, wherein the task process table includes control information of the each hardware circuit corresponding to the each sub-process and the number (SPAN) of clock cycles occupied by hardware processing for the each sub-process;

an input data memory, configured to store input data needed by the each sub-process;

a multiplexer 1, configured to select the input data needed by the current sub-process according to the task process table and send the selected data to the hardware circuit;

the hardware circuit including each hardware circuit corresponding to the each sub-process and configured to perform processing of the each sub-process; and an output data memory, configured to store output data processed by the hardware circuit.

8. The device for implementing task-process-table based hardware control according to claim 7, wherein the control circuit comprises:

a Read Only Memory (ROM) configured to store the task process table, and control the start of the hardware circuit and data processing corresponding to the each sub-process according to the task process table; and a jump sub-circuit, configured to control the hardware circuit to process a next sub-process after the processing of a current sub-process is completed.

9. The device for implementing task-process-table based hardware control according to claim 8, wherein the jump sub-circuit comprises:

an adder 1, configured to count clock cycles after the hardware circuit corresponding to a sub-process is stared;

a comparator 1, configured to compare a counting result of the adder 1 with the SPAN for the sub-process, wherein when the counting result of the adder 1 is less than the SPAN, the comparator 1 outputs a pulse signal to drive the adder 1 to continue counting clock cycles; when the counting result of the adder 1 is equal to the SPAN, the comparator 1 outputs a pulse signal to reset the adder 1 and meanwhile drive an adder 2, the adder 2, configured to count the number of completed sub-processes;

a comparator 2, configured to compare the counting result of the adder 2 with a total number of sub-processes, when the counting result of the adder 2 is less than the total number of the sub-processes, the comparator 2 outputs a pulse signal to drive the adder 2 to continue counting; when the counting result of the adder 2 is equal to the total number of the sub-processes, the comparator 2 outputs a pulse signal to reset the adder 2.

10. The device for implementing task-process-table based hardware control according to claim 7, further comprising:

a constant ROM, configured to store constant data needed during the processing of sub-processes;

a multiplexer 2, configured to select and read the constant data stored in the constant ROM according to the task process table and send the constant data to the hardware circuit;

an intermediate result Random Access Memory (RAM), configured to store data intermediate node result in the processing of the sub-processes;

a multiplexer 3, configured to select data stored in the intermediate result RAM and the corresponding sub-process and read or store the intermediate result, according to the task process table.

11. The method for implementing task-process-table based hardware control according to claim 2, wherein the bit width of the task process table includes:

a number of clock cycles for each single process, for controlling jump of the sub-process; and a control word that needs to use by each single process, for starting a corresponding hardware mechanism.

12. The method for implementing task-process-table based hardware control according to claim 3, wherein the bit width of the task process table includes:

a number of clock cycles for each single process, for controlling jump of the sub-process; and a control word that needs to use by each single process, for starting a corresponding hardware mechanism.

13. The method for implementing task-process-table based hardware control according to claim 2, wherein step C comprises:

step C1: reading the control information from the task process table in an order of the sub-processes, wherein the control information includes input control word, output control word and enabling control word;

step C2: selecting, from input data, data needed by the current sub-process to input, in accordance with the input control word;

step C3: starting the hardware unit corresponding to the current sub-process to process data, in accordance with the enabling control word;

step C4: outputting a processing result of the current sub-process, in accordance with the output control word;

step C5: while performing step C2 to step C4, counting and accumulating the number of clock cycles for performing the steps, when the accumulated number of clock cycles is equal to the SPAN, reading the control information of a next sub-process in the task process table; and step C6: repeating step C2 to step C4 until all sub-processes are performed.

14. The method for implementing task-process-table based hardware control according to claim 3, wherein step C comprises:

step C1: reading the control information from the task process table in an order of the sub-processes, wherein the control information includes input control word, output control word and enabling control word;

step C2: selecting, from input data, data needed by the current sub-process to input, in accordance with the input control word;

step C3: starting the hardware unit corresponding to the current sub-process to process data, in accordance with the enabling control word;

step C4: outputting a processing result of the current sub-process, in accordance with the output control word;

step C5: while performing step C2 to step C4, counting and accumulating the number of clock cycles for performing the steps, when the accumulated number of clock cycles is equal to the SPAN, reading the control information of a next sub-process in the task process table; and step C6: repeating step C2 to step C4 until all sub-processes are performed.

15. The method for implementing task-process-table based hardware control according to claim 13, wherein the control information further comprises constant control word, and/or intermediate result control word; in step C3, the method further comprises:

selecting and reading, in accordance with the constant control word, the constant data needed during operation;

and/or reading or storing, in accordance with the intermediate result control word, the data intermediate node result in processing of the sub-processes.

16. The method for implementing task-process-table based hardware control according to claim 14, wherein the control information further comprises constant control word, and/or intermediate result control word; in step C3, the method further comprises:

selecting and reading, in accordance with the constant control word, the constant data needed during operation;

and/or reading or storing, in accordance with the intermediate result control word, the data intermediate node result in processing of the sub-processes.

17. The device for implementing task-process-table based hardware control according to claim 8, further comprising:

a constant ROM, configured to store constant data needed during the processing of sub-processes;

a multiplexer 2, configured to select and read the constant data stored in the constant ROM according to the task process table and send the constant data to the hardware circuit;

an intermediate result RAM, configured to store data intermediate node result in the processing of the sub-processes;

a multiplexer 3, configured to select data stored in the intermediate result RAM and the corresponding sub-process and read or store the intermediate result, according to the task process table.

18. The device for implementing task-process-table based hardware control according to claim 9, further comprising:

a constant ROM, configured to store constant data needed during the processing of sub-processes;

a multiplexer 2, configured to select and read the constant data stored in the constant ROM according to the task process table and send the constant data to the hardware circuit;

an intermediate result RAM, configured to store data intermediate node result in the processing of the sub-processes;

a multiplexer 3, configured to select data stored in the intermediate result RAM and the corresponding sub-process and read or store the intermediate result, according to the task process table.

* * * * *